(12) United States Patent
Shimatani

(10) Patent No.: US 10,440,194 B1
(45) Date of Patent: Oct. 8, 2019

(54) IMAGE READING DEVICE, IMAGE FORMING APPARATUS

(71) Applicant: KYOCERA Document Solutions Inc., Osaka-shi, Osaka (JP)

(72) Inventor: Akira Shimatani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/278,929

(22) Filed: Feb. 19, 2019

(30) Foreign Application Priority Data

Apr. 9, 2018 (JP) .................................. 2018-074522

(51) Int. Cl.
*H04N 1/00* (2006.01)
*H04N 1/60* (2006.01)
*H04N 1/46* (2006.01)

(52) U.S. Cl.
CPC ..... *H04N 1/00013* (2013.01); *H04N 1/00037* (2013.01); *H04N 1/00063* (2013.01); *H04N 1/00074* (2013.01)

(58) Field of Classification Search
None
See application file for complete search history.

(56) References Cited

U.S. PATENT DOCUMENTS

| | | | | |
|---|---|---|---|---|
| 4,691,365 A | * | 9/1987 | Nagashima | H04N 1/40056 382/274 |
| 5,113,251 A | * | 5/1992 | Ichiyanagi | H04N 1/58 358/453 |
| 5,132,786 A | * | 7/1992 | Ishiwata | H04N 1/62 358/500 |
| 2004/0190092 A1 | * | 9/2004 | Silverbrook | G06F 3/03545 358/539 |
| 2008/0112017 A1 | * | 5/2008 | Nagasaka | H04N 1/4076 358/461 |
| 2012/0140256 A1 | * | 6/2012 | Mori | G06F 3/0625 358/1.13 |
| 2013/0003148 A1 | * | 1/2013 | Kani | H04N 1/2166 358/505 |
| 2013/0222828 A1 | * | 8/2013 | Shimatani | H04N 1/0473 358/1.13 |

(Continued)

FOREIGN PATENT DOCUMENTS

JP 2007150934 A 6/2007

*Primary Examiner* — Anh-Vinh T Nguyen
(74) *Attorney, Agent, or Firm* — Alleman Hall Creasman & Tuttle LLP

(57) ABSTRACT

First representative pixel data is a maximum amount of light, when a light source is turned off. Second representative pixel data and third representative pixel data respectively represent a minimum amount of light and a maximum amount of light for a conspicuous channel to which a piece of data representing an amount of light smaller than an amount of light corresponding to a first threshold belongs. In an image reading device, a determination device, when the third representative pixel data represents an amount of light that is equal to or larger than an amount of light corresponding to at least a second threshold corresponding to the first representative pixel data, or a third threshold corresponding to the second representative pixel data and the first representative pixel data, determines that a device state is defective.

4 Claims, 5 Drawing Sheets

(56) References Cited

U.S. PATENT DOCUMENTS

| | | | | |
|---|---|---|---|---|
| 2014/0029068 A1* | 1/2014 | Takahashi | .......... | H04N 1/40068 |
| | | | | 358/483 |
| 2014/0293364 A1* | 10/2014 | Kawai | ................ | H04N 1/00819 |
| | | | | 358/406 |
| 2015/0002910 A1* | 1/2015 | Miyazaki | ............... | H04N 1/024 |
| | | | | 358/451 |
| 2016/0191738 A1* | 6/2016 | Nakamura | ......... | H04N 1/00803 |
| | | | | 358/1.12 |
| 2017/0126911 A1* | 5/2017 | Kogi | .................... | H04N 1/0035 |
| 2019/0166259 A1* | 5/2019 | Kobayashi | ......... | H04N 1/00013 |

* cited by examiner

IMAGE READING DEVICE, IMAGE FORMING APPARATUS

INCORPORATION BY REFERENCE

This application is based upon and claims the benefit of priority from the corresponding Japanese Patent Application No. 2018-074522 filed on Apr. 9, 2018, the entire contents of which are incorporated herein by reference.

BACKGROUND

The present disclosure relates to an image reading device configured to determine a device state, and relates to an image forming apparatus including the image reading device.

In general, an image reading device includes a light source and an image sensor, wherein the light source irradiates light to a document sheet or a reference member having a uniform color. The reference member is a target of image reading in a shading correction.

The image sensor includes a plurality of light receiving elements for receiving light reflected on the document sheet or the reference member. The plurality of light receiving elements are arranged in alignment along a main scanning direction.

There is known an image reading device configured to determine whether or not the device state is abnormal. For example, there is known an image reading device configured to average, for each of a plurality of blocks of a light source module, one line of image data obtained from the reference member, and to determine that a block is abnormal when averaged data for each block has a singular value.

SUMMARY

An image reading device according to an aspect of the present disclosure includes a light source, an image sensor, a conversion device, an adjustment device, a first representative pixel identifying device, a first determination device, a conspicuous channel identifying device, a second representative pixel identifying device, a second determination device, and a notifying device. The light source irradiates light to a document sheet or to a reference portion having a uniform color. The image sensor has a plurality of light receiving elements that are arranged in alignment along a main scanning direction, the plurality of light receiving elements being respectively assigned to a plurality of channels and receiving light reflected on the document sheet or the reference portion, the image sensor outputting a plurality of image signals representing amounts of light respectively detected by the plurality of light receiving elements for the plurality of channels. The conversion device performs a level adjustment on the plurality of image signals respectively for the plurality of channels based on a level of an adjustment signal that is adjusted in advance, and converts the plurality of image signals after the level adjustment, to a plurality of pieces of pixel data of one line extending in the main scanning direction, the plurality of pieces of pixel data respectively corresponding to the plurality of light receiving elements. The adjustment device adjusts the level of the adjustment signal based on a representative value of a plurality of pieces of first pixel data that are a plurality of pieces of pixel data of one line obtained when the light source is turned off. The first representative pixel identifying device identifies first representative pixel data that represents a maximum amount of light, among a plurality of pieces of second pixel data that are a plurality of pieces of pixel data of one line obtained when the light source is turned on after the level of the adjustment signal is adjusted. The first determination device determines that a device state is normal when each of all values of a plurality of pieces of third pixel data represents an amount of light that is equal to or larger than an amount of light corresponding to a predetermined first threshold, the plurality of pieces of third pixel data being a plurality of pieces of pixel data of one line obtained when the light source is irradiating light to the reference portion after the level of the adjustment signal is adjusted. The conspicuous channel identifying device, when the first determination device does not determine that the device state is normal, identifies, from among the plurality of channels, one or more conspicuous channels each of which corresponds to a plurality of pieces of third pixel data including a piece of third pixel data representing an amount of light smaller than an amount of light corresponding to the first threshold. The second representative pixel identifying device identifies, for each of the one or more conspicuous channels, second representative pixel data that represents a minimum amount of light and third representative pixel data that represents a maximum amount of light, from among the plurality of pieces of third pixel data corresponding to each of the one or more conspicuous channels. The second determination device, for each of the one or more conspicuous channels, when the third representative pixel data represents an amount of light that is equal to or larger than an amount of light corresponding to at least a second threshold or a third threshold, determines that the device state is defective, and otherwise, determines that the device state is abnormal, the second threshold being determined based on the first representative pixel data, the third threshold being determined for each of the one or more conspicuous channels based on the second representative pixel data and the first representative pixel data. The notifying device makes a notification that is different between a case where the device state is determined to be defective and a case where the device state is determined to be abnormal. The second threshold corresponds to an amount of light that is larger than an amount of light represented by the first representative pixel data, and the third threshold corresponds to an amount of light that is larger than an amount of light represented by the second representative pixel data.

An image forming apparatus according to an aspect of the present disclosure includes the image reading device and a print processing device. The print processing device forms an image on a sheet based on a plurality of pieces of pixel data that are obtained in the image reading device while the light source is irradiating light to the document sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
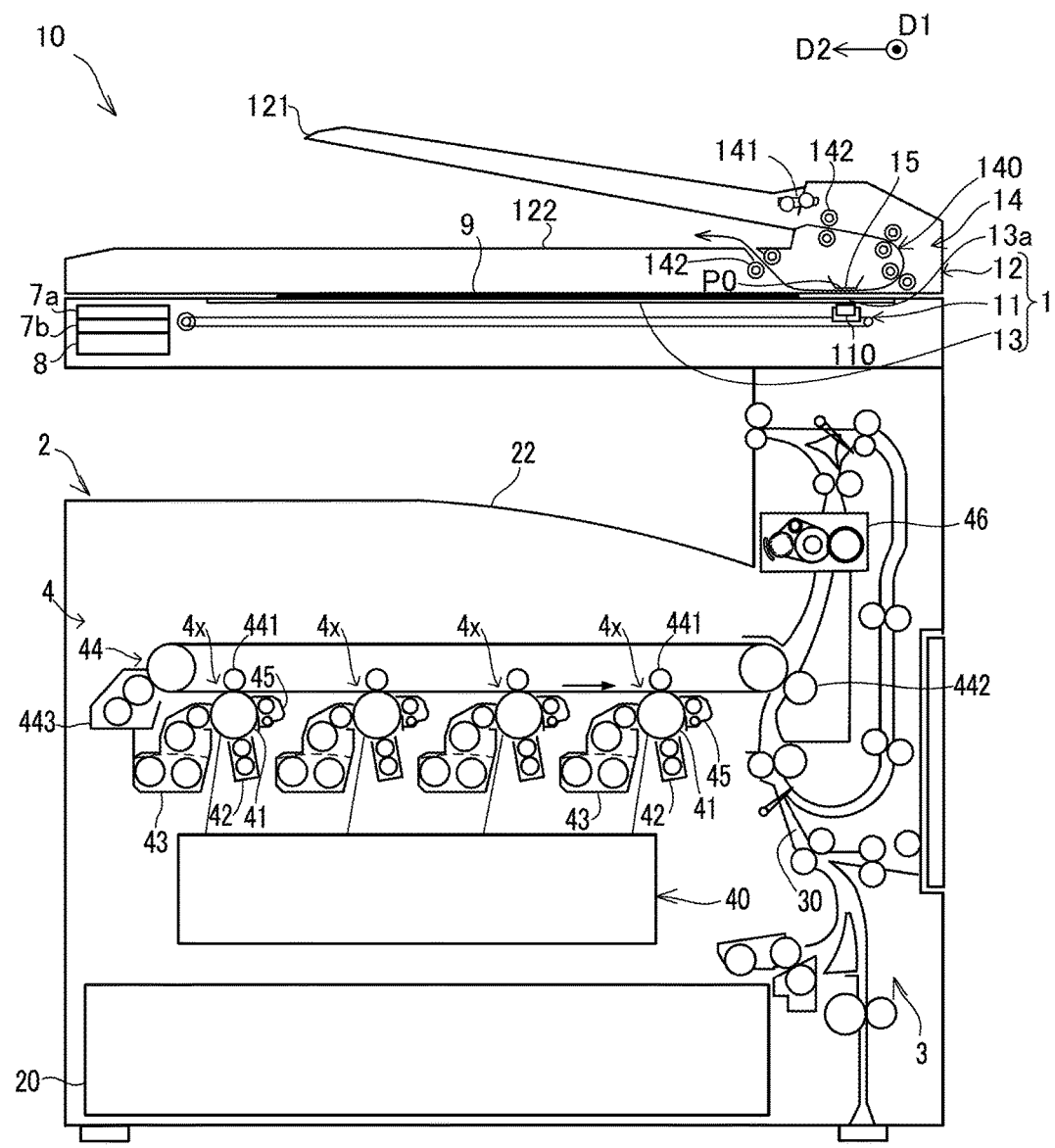
FIG. 1 is a configuration diagram of an image forming apparatus including an image reading device according to an embodiment of the present disclosure.

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

An image reading device 1 according to the embodiment of the present disclosure constitutes a part of an image forming apparatus 10. The image forming apparatus 10 includes the image reading device 1 and a print processing device 2. Furthermore, the image forming apparatus 10 includes an operation device 7a, a display device 7b, and a data processing device 8 that are common to the image reading device 1 and the print processing device 2.

For example, the image forming apparatus 10 is a copier, a printer or a facsimile apparatus having a function of a copier, or a multifunction peripheral having a plurality of image processing functions including an image reading function.

The image reading device 1 executes a reading process to read an image of a document sheet 9. The print processing device 2 executes a print process to form an image on a sheet.

A target image of the print process is, for example, an image read by the image reading device 1, or an image provided by print job data received from a terminal apparatus (not shown). The sheet is a sheet-like image formation medium such as a sheet of paper or an OHP sheet.

The print processing device 2 shown in FIG. 1 forms a toner image on a sheet by an electrophotographic system. It is noted that the print processing device 2 may form an image on a sheet by another system such as an ink jet system.

The operation device 7a and the display device 7b are man-machine interface devices. For example, the display device 7b may include a panel display such as a liquid crystal display, and the operation device 7a may include a touch panel and operation buttons.

The data processing device 8 executes data processing on various types of data such as image data obtained via the image reading device 1. Furthermore, the data processing device 8 controls various types of electric devices of the image processing apparatus 10 based on information input through the operation device 7a and information detected by various types of sensors.

[Configuration of Image Reading Device 1]

As shown in FIG. 1, the image reading device 1 includes a platen glass 13, a contact glass 13a, an image sensor unit 110, a movable support device 11, and a platen cover 12. The platen cover 12 incorporates an ADF (Automatic Document Feeder) 14.

A document sheet 9 is placed on the platen glass 13 or is conveyed by the ADF 14. The document sheet 9 is a target of image reading. The platen cover 12 is supported such that it is displaceable between a position for covering the platen glass 13 and an opening position for opening a space above the platen glass 13.

In the following description, a width direction of the document sheet 9 is referred to as a main scanning direction D1. In addition, a direction in which scanning light moves in the image reading is referred to as a sub scanning direction D2. The sub scanning direction D2 is perpendicular to the main scanning direction D1. It is noted that FIG. 1 and FIG. 2 show the sub scanning direction D2 in a case where the document sheet 9 is placed on the platen glass 13.

The automatic document sheet conveying device 14 includes a document sheet feeding mechanism 141 and a document sheet conveyance roller 142. The document sheet feeding mechanism 141 feeds a document sheet 9 placed on a document sheet supply tray 121 onto a document sheet conveyance path 140. The document sheet conveyance roller 142 conveys the document sheet 9 along the document sheet conveyance path 140, and discharges the document sheet 9 onto a document sheet discharge tray 122.

Figure 2:
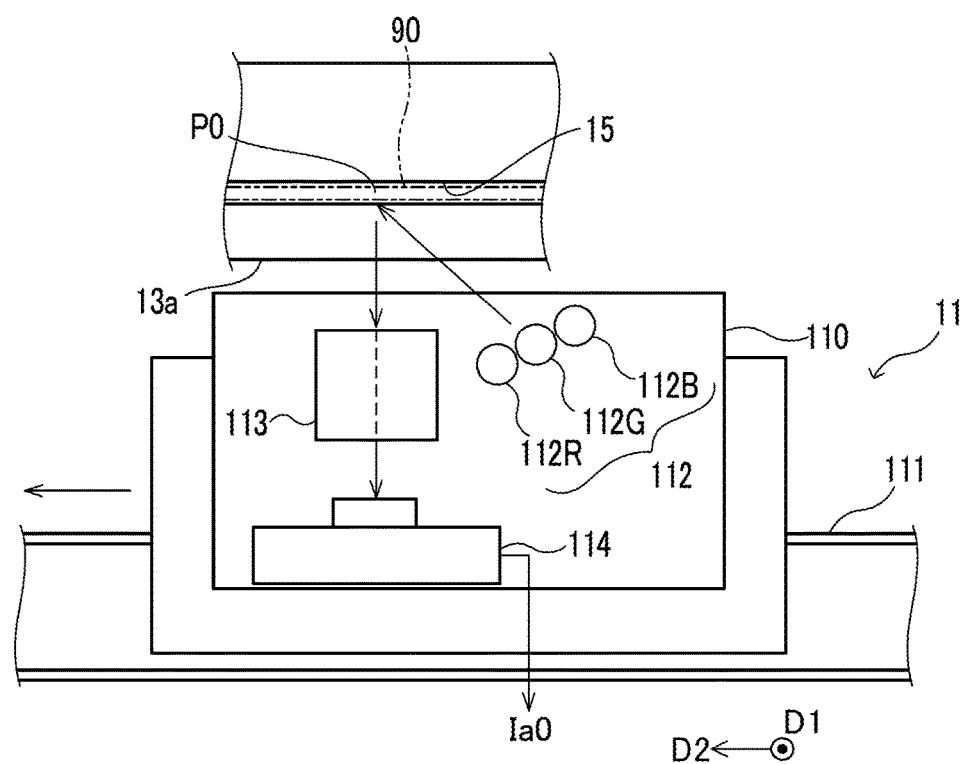
FIG. 2 is a configuration diagram of an image sensor unit and its periphery included in the image reading device according to the embodiment.

As shown in FIG. 2, the image sensor unit 110 includes a light source 112, a lens 113, and an image sensor 114. The light source 112 includes a red light source 112R, a green light source 112G, and a blue light source 112B.

The image sensor unit 110 of the present embodiment is a CIS module. The light source 112, the lens 113, and the image sensor 114 are formed to extend along the main scanning direction D1.

The light source 112 emits three colors of light toward a line region that extends along the main scanning direction D1 on the document sheet 9. The three colors of light are red light, green light, and blue light.

For example, each of the red light source 112R, the green light source 112G, and the blue light source 112B may be an LED array that includes a plurality of light emitting diodes arranged in alignment along the main scanning direction D1.

In a case where the document sheet 9 is placed on the platen glass 13, the light source 112 emits the three colors of light toward the line region of the document sheet 9 from under the platen glass 13. The three colors of light are irradiated to the document sheet 9 via the platen glass 13. In this state, the movable support device 11 moves the image sensor unit 110 along the sub scanning direction D2. This allows the light emitted from the light source 112 to scan a surface of the document sheet 9 along the sub scanning direction D2.

On the other hand, when the document sheet 9 is conveyed by the ADF 14, the light source 112 emits the three colors of light toward the line region of the document sheet 9 that passes through a reference position P0 that is in the middle of the document sheet conveyance path 140. In this case, the three colors of light are irradiated to the document sheet 9 via the contact glass 13a.

That is, when the document sheet 9 is placed on the platen glass 13, the movable support device 11 allows the light emitted from the light source 112 to scan the surface of the document sheet 9 along the sub scanning direction D2. In addition, when the document sheet 9 is conveyed by the ADF 14, the ADF 14 allows the light from the light source 112 to scan the surface of the document sheet 9 along the sub scanning direction D2. The movable support device 11 and the ADF 14 are examples of a scanning device.

The lens 113 collects light reflected on the line region of the document sheet 9 into a light receiving portion of the image sensor 114. The image sensor 114 is configured to detect an amount of light diffused and reflected on the line region of the document sheet 9.

The image sensor 114 is a photoelectric conversion element array including a plurality of light receiving elements aligned along the main scanning direction D1. In general, each of the light receiving elements is a photoelectric conversion element such as a CMOS image sensor.

The image sensor 114 outputs an analog line image signal Ia0 that represents an amount of light diffused and reflected on the line region of the document sheet 9. The line image signal Ia0 represents the density of a line image that is an image of the line region of the document sheet 9.

When adjustment of the image sensor 114 is made, the image sensor unit 110 is positioned to a position that faces a reference member 15. In the present embodiment, the reference member 15 is disposed at the reference position P0.

The surface of the reference member 15 has a uniform color. For example, the color of the surface of the reference member 15 may be white or pale yellow. It is noted that the surface of the reference member 15 is an example of a reference portion.

The adjustment of the image sensor 114 is performed in a state where the document sheet 9 is not present at the reference position P0. In this case, the light source 112 emits light to the reference member 15. Furthermore, the image sensor 114 outputs the line image signal Ia0 that represents an amount of light diffused and reflected on the surface of the reference member 15.

That is, when an image of the document sheet 9 is read, the light source 112 irradiates light to the document sheet 9. On the other hand, when adjustment of the image sensor 114 is made, the light source 112 irradiates light to the reference member 15.

It is noted that another image sensor unit 110 may be fixed at a position that faces a rear surface of the document sheet 9 conveyed along the document sheet conveyance path 140. In this case, another reference member 15 is disposed at a position that faces the fixed image sensor unit 110. In this case, one of a plurality of document sheet conveyance rollers 142 may serve as the reference member 15.

Figure 3:
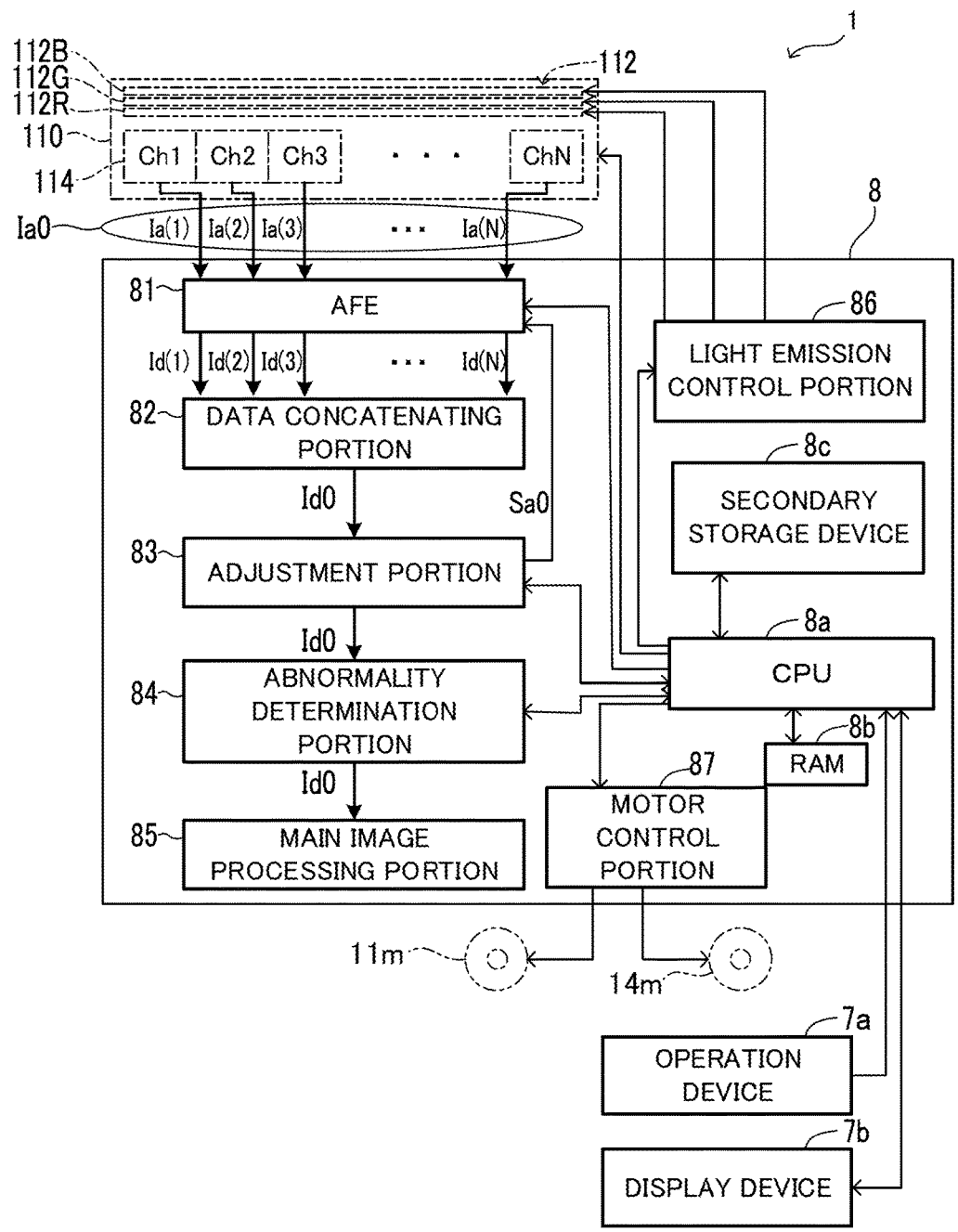
FIG. 3 is a block diagram of a data processing portion included in the image reading device according to the embodiment.

As shown in FIG. 3, the image sensor 114 is divided into a plurality of channels aligned in the main scanning direction D1. In FIG. 3, the image sensor unit 110 is represented by an imaginary line (a two-dot chain line).

The line image signal Ia0 output from the image sensor 114 is composed of a plurality of channel image signals Ia that respectively correspond to the plurality of channels. The image sensor 114 outputs a plurality of channel image signals Ia(1) to Ia(N) in parallel.

That is, the image sensor 114 includes a plurality of light receiving elements that receive light reflected on the document sheet 9 or the reference member 15. The plurality of light receiving elements align along the main scanning direction D1 and are respectively assigned to the plurality of channels.

The image sensor 114 outputs, in parallel, the plurality of channel image signals Ia(1) to Ia(N) that represent amounts of light respectively detected by the plurality of light receiving elements. The channel image signals Ia(1) to Ia(N) are analog.

In FIG. 3, the suffixes (1) to (N) of the channel image signals Ia(1) to Ia(N) represent channel numbers, and "N" represents the number of channels. For example, the channel number N exceeds 10 (ten).

As shown in FIG. 3, the data processing device 8 executes various types of signal processing on the line image signal Ia0 output from the image sensor 114. For example, the data processing device 8 includes an AFE (Analog Front End) 81, a data concatenating portion 82, and an adjustment portion 83, wherein the AFE 81 performs predetermined signal processing on the line image signal Ia0 output from the image sensor 114.

The AFE 81, the data concatenating portion 82, and the adjustment portion 83 are implemented by an electronic circuit(s) such as an ASIC (Application Specific Integrated Circuit). In addition, the data concatenating portion 82 may be implemented by a processor such as an MPU (Micro Processing Unit) or a DSP (Digital Signal Processor).

The AFE 81 converts the plurality of channel image signals Ia(1) to Ia(N) respectively to a plurality of pieces of digital channel image data Id(1) to Id(N). During the conversion of the analog signals to the digital data, the AFE 81 performs an offset adjustment on the plurality of channel image signals Ia(1) to Ia(N), and amplifies the signals after the offset adjustment.

Furthermore, the AFE 81 generates the plurality of pieces of channel image data Id(1) to Id(N) by digitally converting the amplified signals. In FIG. 3, the suffixes (1) to (N) of the plurality of pieces of channel image data Id(1) to Id(N) represent the channel numbers.

In the offset adjustment, an adjustment signal Sa0 that has been adjusted in advance is added to the plurality of channel image signals Ia(1) to Ia(N). The level of the adjustment signal Sa0 is adjusted in advance by the adjustment portion 83 that is described below.

It is noted that the offset adjustment is an example of a level adjustment that is performed on each of channel image signals Ia based on the level of the adjustment signal Sa0.

The plurality of pieces of channel image data Id(1) to Id(N) are composed of a plurality of pieces of pixel data of one line that align along the main scanning direction D1 and respectively correspond to the plurality of light receiving elements. The plurality of channel image signals Ia(1) to Ia(N) respectively correspond to the plurality of channels.

As described above, the AFE 81 performs the offset adjustment on the plurality of channel image signals Ia(1) to Ia(N) based on the level of the adjustment signal Sa0 that is adjusted in advance, and converts the signals after the offset adjustment to a plurality of pieces of pixel data. The AFE 81 is an example of a conversion device.

The data concatenating portion 82 generates line image data Id0 by concatenating a plurality of pieces of channel image data Id. It is noted that the line image data Id0 is composed of the plurality of pieces of pixel data of one line.

The adjustment portion 83 adjusts the level of the adjustment signal Sa0 based on a representative value of the line image data Id0 that is obtained when the light source 112 is turned off. Specifically, the adjustment portion 83 sets the level of the adjustment signal Sa0 based on a difference between the representative value of the line image data Id0 before adjustment and a predetermined reference value.

For example, the adjustment portion 83 adjusts the level of the adjustment signal Sa0 so that the minimum value of the line image data Id0 before adjustment matches the reference value. Subsequently, the adjustment portion 83 supplies the adjustment signal Sa0 after adjustment to the AFE 81.

When the image reading device 1 executes a monochrome image reading process, all of the red light source 112R, the green light source 112G, and the blue light source 112B are continuously turned on. This allows white light to be irradiated to the line region of the document sheet 9 or the reference member 15.

On the other hand, when the image reading device 1 executes a color image reading process, the red light source 112R, the green light source 112G, and the blue light source 112B are turned on one by one in sequence in a predetermined order. This allows a plurality of colors of light to be irradiated one by one in sequence on the line region of the document sheet 9 or the reference member 15.

The data processing device 8 further includes a light emission control portion 86, a motor control portion 87, a CPU (Central Processing Unit) 8a, a RAM (Random Access Memory) 8b, and a secondary storage device 8c.

The light emission control portion 86 controls turning on and off of the light source 112. The motor control portion 87 controls a first motor 11m and a second motor 14m. The first motor 11m is a power source of the movable support device 11. The second motor 14m is a power source of the ADF 14. That is, the motor control portion 87 controls the movable support device 11 and the ADF 14.

The CPU 8a controls devices included in the image forming apparatus 10. For example, the CPU 8a outputs a control signal to each of the AFE 81, the image sensor 114, light emission control portion 86, and the motor control portion 87 so as to start a process thereof.

Furthermore, the CPU 8a receives an operation performed by the user on the operation device 7a, and controls the display device 7b in accordance with the received operation. For example, the CPU 8a displays a menu screen or a message on the display device 7b.

The secondary storage device 8c is a computer-readable non-volatile storage device. The secondary storage device 8c stores programs and various types of data. For example, either or both of a flash memory and a hard disk drive are adopted as the secondary storage device 8c.

The RAM 8b is a volatile storage device configured to primarily store: a program executed by the CPU 8a; and data that is output and consulted during an execution of the program by the CPU 8a. The RAM 8b provides data access at a higher speed than the secondary storage device 8c.

[Configuration of Print Processing Device 2]

The print processing device 2 is configured to form an image on a sheet based on the plurality of pieces of pixel data that are obtained when the light source 112 of the image reading device 1 emits light to the document sheet 9.

As shown in FIG. 1, the print processing device 2 includes a sheet conveying portion 3 and an image forming portion 4. The sheet conveying portion 3 feeds a sheet from a sheet storage portion 20 into a sheet conveyance path 30, and further conveys the sheet along the sheet conveyance path 30. In addition, the sheet conveying portion 3 discharges the sheet from the sheet conveyance path 30 onto a discharged tray 22.

The image forming portion 4 shown in FIG. 1 forms an image on a sheet by an electrophotographic system. As a result, the image forming portion 4 includes image creation units 4x, a laser scanning unit 40, a transfer device 44, and a fixing device 46.

In each of the image creation units 4x, a drum-like photoconductor 41 rotates, and a charging device 42 charges the surface of the photoconductor 41 uniformly.

Furthermore, the laser scanning unit 40 writes an electrostatic latent image on the charged surface of the photoconductor 41. For example, the laser scanning unit 40 writes the electrostatic latent image corresponding to the plurality of pieces of pixel data, on the surface of the photoconductor 41.

The developing device 43 in each of the image creation units 4x develops the electrostatic latent image to a toner image. The transfer device 44 transfers the toner image from the surface of the photoconductor 41 to the sheet. In addition, a drum cleaning device 45 in each of the image creation units 4x removes residual toner from the surface of the photoconductor 41.

The fixing device 46 fixes the toner image to the sheet by heating and applying pressure to the toner image on the sheet.

As shown in FIG. 1, the print processing device 2 is a color printer including the tandem-type image forming portion 4. Accordingly, the print processing device 2 includes four image creation units 4x, and the transfer device 44 includes four primary transfer devices 441, an intermediate transfer belt 440, a secondary transfer device 442, and a belt cleaning device 443.

Each of the four image creation units 4x includes the photoconductor 41, the charging device 42, the developing device 43, and the drum cleaning device 45. The intermediate transfer belt 440 rotates while in contact with surfaces of the four photoconductors 41.

The four image creation units 4x respectively form toner images of colors cyan, magenta, yellow, and black on the surfaces of the photoconductors 41. The four primary transfer devices 441 transfer toner images from the four photoconductors 41 to the intermediate transfer belt 440. This allows the toner images of the four colors to be overlaid on the intermediate transfer belt 440 such that a color toner image is formed on the intermediate transfer belt 440.

The secondary transfer device 442 transfers the toner image from the intermediate transfer belt 440 to the sheet. The belt cleaning device 443 removes residual toner from the intermediate transfer belt 440. It is noted that the image forming portion 4 may be a device adopting another system such as an ink jet system.

Meanwhile, in the image sensor 114, the plurality of light receiving elements are respectively assigned to the plurality of channels. In general, the plurality of light receiving elements in the CIS module are respectively assigned to the plurality of channels. In this case, the image sensor 114 outputs a plurality of image signals that respectively correspond to the plurality of channels.

An abnormality of the image sensor 114 may occur in a range of channel. However, if it is determined whether or not an abnormality has occurred in the image sensor 114 for each range of channel, it would take time until the result of the determination is obtained. If it takes time until a result of such determination is obtained, start of processing by the image reading device 1 is delayed.

In addition, it is desirable that in determining a device state of the image reading device 1, the device state is distinguished between: an abnormal state where the image sensor 114 or the light source 112 itself does not function normally; and a defective state where, for example, a foreign matter has adhered to the light source 112.

In the image reading device 1, the data processing device 8 executes an abnormality determination process that is described below. This allows the image reading device 1 to, in a case where the plurality of light receiving elements of the image sensor 114 are respectively assigned to the plurality of channels, determine, for each channel, whether or not the image reading device 1 is normal, with distinction between the abnormal state and the defective state, while preventing start of image reading from being delayed.

The data processing device 8 further includes an abnormality determination portion 84 and a main image processing portion 85. The CPU 8a, the abnormality determination portion 84, and the light emission control portion 86 execute the abnormality determination process to determine the state of the image sensor 114 and the light source 112.

The main image processing portion 85 executes various types of correction processing on the line image data Id0, and other image processing.

The abnormality determination portion 84 and the main image processing portion 85 are implemented by an electronic circuit(s) such as an ASIC. In addition, the abnormality determination portion 84 and the main image processing portion 85 may be implemented by a processor(s) such as an MPU or a DSP.

For example, when an operation to start the reading process is performed on the operation device 7a, the CPU 8a executes the abnormality determination process together with the abnormality determination portion 84 and the light emission control portion 86 before the reading process is started.

The abnormality determination process is started in a state where the image sensor unit 110 is positioned at the reference position P0 by the movable support device 11.

[Abnormality Determination Process]

Next, an example of a procedure of the abnormality determination process is described with reference to a flowchart shown in FIG. 4 and a distribution of the line image data Id0 shown in FIG. 5.

Figure 4:
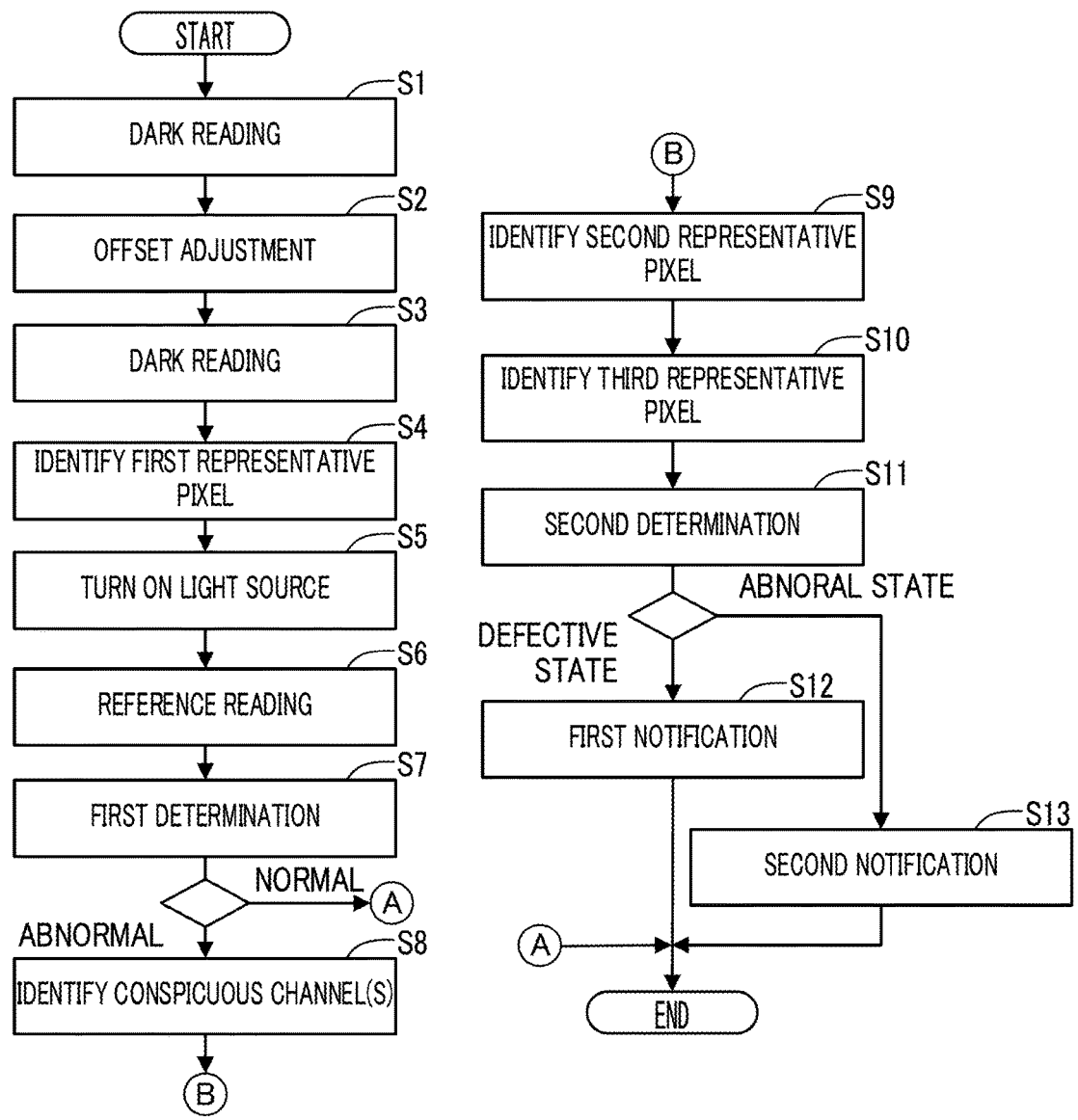
FIG. 4 is a flowchart showing an example of a procedure of an abnormality determination process executed by the image reading device according to the embodiment.

S1, S2, . . . shown in FIG. 4 are identification signs representing a plurality of steps of the abnormality determination process. In addition, the vertical axis Vp0 of the graph in FIG. 5 represents values of the plurality of pieces of pixel data in the line image data Id0.

<Step S1>

In the abnormality determination process, first, the CPU 8a causes the image sensor 114 to execute a dark reading process. In the dark reading process, the image sensor 114 reads an image in a state where the light emission control portion 86 has turned off the light source 112.

In step S1, a piece of line image data Id0 composed of a plurality of pieces of pixel data of one line is obtained in a state where the light source 112 is turned off.

In the following description, the plurality of pieces of pixel data of one line constituting a piece of line image data Id0 obtained in step S1, are referred to as a plurality of pieces of first pixel data Dp1 (see FIG. 5).

<Step S2>

Subsequently, the adjustment portion 83 adjusts the level of the adjustment signal Sa0 based on a representative value of the plurality of pieces of first pixel data Dp1. The adjustment portion 83 executing the process of step S2 is an example of an adjustment device.

Figure 5:
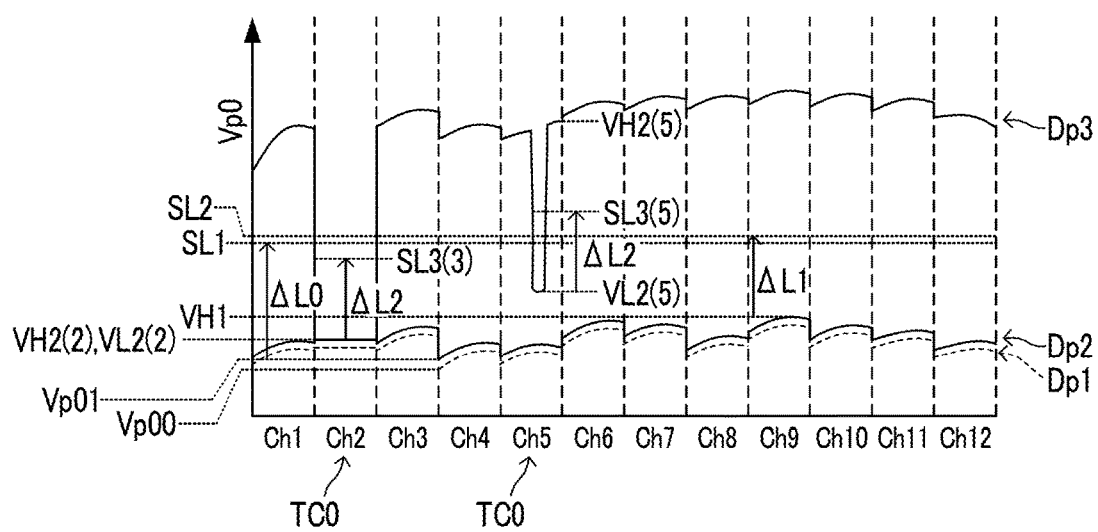
FIG. 5 is a diagram showing an example of distribution of line image data in the image reading device according to the embodiment.

As described above, the adjustment portion 83 adjusts the level of the adjustment signal Sa0 so that a minimum value Vp00 of the plurality of pieces of first pixel data Dp1 before adjustment matches a predetermined reference value Vp01 (see FIG. 5).

For example, a lookup table or a formula representing a relationship between: differences between the minimum value Vp00 and the reference value Vp01; and levels of the adjustment signal Sa0, may be prepared in advance. In this case, the adjustment portion 83 obtains a level of the adjustment signal Sa0 by applying a difference between the minimum value Vp00 and the reference value Vp01 to the lookup table or the formula, and sets the obtained level of the adjustment signal Sa0.

<Step S3>

Subsequently, the CPU 8a causes the image sensor 114 to execute the dark reading process.

In step S3, a piece of line image data Id0 composed of a plurality of pieces of pixel data of one line is obtained in a state where the light source 112 is turned off after adjustment of the level of the adjustment signal Sa0.

In the following description, the plurality of pieces of pixel data of one line constituting a piece of line image data Id0 obtained in step S3, are referred to as a plurality of pieces of second pixel data Dp2 (see FIG. 5).

<Step S4>

Subsequently, the abnormality determination portion 84 identifies, from among the plurality of pieces of second pixel data Dp2, first representative pixel data that represents the maximum amount of light.

In FIG. 5, VH1 denotes a value of the first representative pixel data. It is noted that the abnormality determination portion 84 executing the process of step S4 is an example of a first representative pixel identifying device.

<Step S5>

The light emission control portion 86 turns on the light source 112. In the present embodiment, the light emission control portion 86 turns on the red light source 112R, the green light source 112G, and the blue light source 112B one by one in sequence.

<Step S6>

The CPU 8a causes the image sensor 114 to execute a reference reading process. In the reference reading process, the image sensor 114 reads the reference member 15 in a state where the light source 112 is turned on.

In the present embodiment, each time the red light source 112R, the green light source 112G, or the blue light source 112B is turned on, the CPU 8a causes the image sensor 114 to execute the reference reading process.

In step S6, for each of the colors red, green, and blue, a piece of line image data Id0 composed of a plurality of pieces of pixel data of one line is obtained in a state where the light source 112 is irradiating light to the reference member 15. Specifically, the line image data Id0 corresponding to the colors red, green, and blue is obtained.

In the following description, the plurality of pieces of pixel data of one line constituting a piece of line image data Id0 obtained in step S6, are referred to as a plurality of pieces of third pixel data Dp3 (see FIG. 5). The plurality of pieces of third pixel data Dp3 are obtained after the level of the adjustment signal Sa0 is adjusted in step S2.

<Step S7>

Subsequently, the abnormality determination portion 84 executes a first determination process. The abnormality determination portion 84 executing the process of step S7 is an example of a first determination device. It is noted that the process of step S7 is executed for each three sets of the plurality of pieces of third pixel data Dp3 corresponding to the colors red, green, and blue.

In the first determination process, it is determined that the device state is normal when each of all values of the plurality of pieces of third pixel data Dp3 is equal to or larger than a first threshold SL1, and otherwise, it is determined that the device state is abnormal.

For example, the first threshold SL1 is obtained by adding a predetermined value ATM to the reference value Vp01 used for the offset adjustment (see FIG. 5).

In the present embodiment, with regard to a value of each of the plurality of pieces of pixel data constituting a piece of line image data Id0, the larger the value is, the larger the amount of light detected by the image sensor 114 is. As a result, when a value of each of the plurality of pieces of third pixel data Dp3 is equal to or larger than the first threshold SL1, it means that each of the plurality of pieces of third pixel data Dp3 represents an amount of light that is equal to or larger than an amount of light corresponding to the first threshold SL1.

In a case where the smaller the value of each of the plurality of pieces of pixel data is, the larger the amount of light detected by the image sensor 114 is, the first threshold SL1 having a different value from that of the above-described one is set. In this case, when a value of each of the plurality of pieces of third pixel data Dp3 is equal to or smaller than the first threshold SL1, it means that each of the plurality of pieces of third pixel data Dp3 represents an amount of light that is equal to or larger than an amount of light corresponding to the first threshold SL1.

Upon determining that the device state is normal, the abnormality determination portion 84 ends the abnormality determination process, and upon determining that the device state is abnormal, the abnormality determination portion 84 moves the process to step S8.

<Step S8>

In step S8, the abnormality determination portion 84 executes a process to identify one or more conspicuous channels TC0 from among the plurality of channels (see FIG. 5). The abnormality determination portion 84 executing the process of step S8 is an example of a conspicuous channel identifying device.

Each conspicuous channel TC0 among the plurality of channels corresponds to a plurality of pieces of third pixel data Dp3 including a piece of third pixel data Dp3 representing an amount of light that is smaller than an amount of light corresponding to the first threshold SL1. In the example shown in FIG. 5, the channel 2 and the channel 5 are conspicuous channels TC0.

It is noted that the process of step S8 is executed for each three sets of the plurality of pieces of third pixel data Dp3 corresponding to the colors red, green, and blue.

In the following description, it is assumed that the channel number of the conspicuous channels TC0 is i. It is noted that, as described above, the process of step S8 is executed when it is determined in step S7 that the device state is abnormal.

<Step S9>

Subsequently, the abnormality determination portion 84 identifies, for each of the conspicuous channels TC0, second representative pixel data that represents the minimum amount of light among the plurality of pieces of third pixel data Dp3 corresponding to each of the conspicuous channels TC0.

It is noted that the process of step S9 is executed for each three sets of the plurality of pieces of third pixel data Dp3 corresponding to the colors red, green, and blue.

In FIG. 5, VL2(2) denotes a value of the second representative pixel data for the channel 2, and VL2(5) denotes a value of the second representative pixel data for the channel 5.

<Step S10>

Furthermore, the abnormality determination portion 84 identifies, for each of the conspicuous channels TC0, third representative pixel data that represents the maximum amount of light among the plurality of pieces of third pixel data Dp3 corresponding to that conspicuous channel TC0.

It is noted that the process of step S10 is executed for each three sets of the plurality of pieces of third pixel data Dp3 corresponding to the colors red, green, and blue.

In FIG. 5, VH2(2) denotes a value of third representative pixel data for the channel 2, and VH2(5) denotes a value of third representative pixel data for the channel 5.

It is noted that the abnormality determination portion 84 executing the processes of steps S9 and S10 is an example of a second representative pixel identifying device.

<Step S11>

Subsequently, the abnormality determination portion 84 executes a second determination process. The abnormality determination portion 84 executing the process of step S11 is an example of a second determination device.

In the second determination process, a determination is made for each of the conspicuous channels TC0. Specifically, when value VH2($i$) of the third representative pixel data is equal to or larger than at least a second threshold SL2 or a third threshold SL3($i$), it is determined that the device state is defective, and otherwise, it is determined that the device state is abnormal.

It is noted that the process of step S11 is executed for each three sets of the plurality of pieces of third pixel data Dp3 corresponding to the colors red, green, and blue.

The second threshold SL2 is set in common to all of the channels. The second threshold SL2 is determined based on the first representative pixel data. The second threshold SL2 corresponds to an amount of light larger than an amount of light represented by the first representative pixel data.

For example, the second threshold SL2 is obtained by adding a predetermined value ΔL1 to the value VH1 of the first representative pixel data (see FIG. 5). In this case, the second threshold SL2 is calculated by applying the value VH1 of the first representative pixel data to the following equation (1).

[Math. 1]

$$SL2 = VH1 + \Delta L1 \quad (1)$$

On the other hand, the third threshold SL3($i$) is set for each of the conspicuous channels TC0. The third threshold SL3($i$) is determined based on a value VL2($i$) of the second representative pixel data and the value VH1 of the first representative pixel data.

For each of the conspicuous channels TC0, the third threshold SL3($i$) corresponds to an amount of light that is larger than an amount of light represented by the second representative pixel data.

For example, the third threshold SL3($i$) is obtained by adding a predetermined addition value ΔL2($i$) that is set for each channel in advance, to the value VL2($i$) of the second representative pixel data (see FIG. 5). In this case, the third threshold SL3($i$) is calculated by applying the value VL2($i$) of the second representative pixel data to the following equation (2).

[Math. 2]

$$SL3(i) = VL2(i) + \Delta L2(i) \quad (2)$$

The addition value ΔL2($i$) is obtained by adding a predetermined adjustment value a0 to a dark output maximum difference ΔV(i) that is set for each of the channels in advance. The dark output maximum difference ΔV(i) represents the maximum variance of an output value of each of the channels of the image sensor 114, which is detected when the light source 112 is turned off. The dark output maximum difference ΔV(i) is a known value included in the specifications of the image sensor 114. In this case, the addition value ΔL2(i) is calculated by applying the dark output maximum difference ΔV(i) to the following equation (3).

[Math. 3]

$$\Delta L2(i) = \Delta V(i) + \alpha 0 \qquad (3)$$

In the equation (3), the dark output maximum difference ΔV(i) is a constant that is set for each of the conspicuous channels TC0, and the adjustment value α0 is a constant that is common to all the channels. Accordingly, the third threshold SL3(i) that is calculated using the equations (2) and (3) is a value that is obtained by adding a predetermined value that is set for each of the channels, to the second representative pixel data.

In the present embodiment, when value VH2(i) of the third representative pixel data is equal to or larger than the second threshold SL2, it means that the third representative pixel data represents an amount of light that is equal to or larger than an amount of light corresponding to the second threshold SL2.

Similarly, when value VH2(i) of the third representative pixel data is equal to or larger than the third threshold SL3(i), it means that the third representative pixel data represents an amount of light that is equal to or larger than an amount of light corresponding to the third threshold SL3(i).

In addition, when the device state is abnormal, it means that the image sensor 114 or the light source 112 itself is not functioning normally in the conspicuous channel TC0.

On the other hand, when the device state is defective, it means that a foreign matter has adhered to a portion of the image sensor 114 or the light source 112 that corresponds to the third representative pixel data. In this case, the device state resumes to a normal state by removing the foreign matter.

In the example shown in FIG. 5, value VH2(2) of the third representative pixel data for the channel 2 is smaller than the second threshold SL2 and the third threshold SL3(2) of the channel 2. In this case, the abnormality determination portion 84 determines that the device state of the channel 2 is abnormal.

In addition, in the example shown in FIG. 5, value VH2(5) of the third representative pixel data for the channel 5 is larger than the second threshold SL2 and the third threshold SL3(5) of the channel 5. In this case, the abnormality determination portion 84 determines that the device state of the channel 5 is defective.

Upon determining that the device state is defective, the abnormality determination portion 84 moves the process to step S12, and upon determining that the device state is abnormal, the abnormality determination portion 84 moves the process to step S13.

It is noted that the result of the determination on the device state may be different for each of the conspicuous channels TC0. In this case, the process of step S12 is executed on a conspicuous channel(s) TC0 for which it has been determined that the device state is defective, and the process of step S13 is executed on a conspicuous channel(s) TC0 for which it has been determined that the device state is abnormal.

<Step S12>

In step S12, the CPU 8a makes a first notification to notify that the device state for the conspicuous channel TC0 is defective. For example, in the first notification, the CPU 8a displays, on the display device 7b, a message indicating that a defect has occurred to the device state for the conspicuous channel TC0. Thereafter, the CPU 8a ends the abnormality determination process.

<Step S13>

In step S13, the CPU 8a makes a second notification to notify that the device state for the conspicuous channel TC0 is abnormal. For example, in the second notification, the CPU 8a displays, on the display device 7b, a message indicating that an abnormality has occurred to the device state for the conspicuous channel TC0. Thereafter, the CPU 8a ends the abnormality determination process.

That is, the CPU 8a makes a notification that is different between a case where the device state is determined to be defective and a case where the device state is determined to be abnormal. It is noted that the CPU 8a executing the processes of steps S12 and S13 is an example of a notifying device.

When it is determined that the device state is normal, the CPU 8a, the light emission control portion 86, and the motor control portion 87, following the end of the abnormality determination process, cause the light source 112, the movable support device 11, and the image sensor 114 to execute the reading process on the document sheet 9.

On the other hand, when it is determined that the device state is defective or abnormal, the CPU 8a, the light emission control portion 86, and the motor control portion 87 do not cause the light source 112, the movable support device 11, and the image sensor 114 to execute the reading process on the document sheet 9.

The user conveys the content of the first notification or the second notification to a maintenance person. This allows the maintenance person to quickly take appropriate measures to restore the image reading device 1.

As described above, the first determination process executed in step S7 is a simple process that does not require data processing for each of the channels. That is, it is possible to determine, in an extremely short time, that the device state is normal.

Accordingly, with the above-described configuration, in a case where the plurality of light receiving elements of the image sensor 114 are respectively assigned to the plurality of channels, the image reading device 1 can prevent start of image reading of the document sheet 9 from being delayed.

Furthermore, the image reading device 1 is configured to determine the device state for each of the channels by distinguishing between the abnormal state and the defective state (step S11). This contributes to a rapid restoration of the image reading device 1.

In addition, in the abnormality determination process of the image reading device 1, after the reference reading process (step S6) is executed in a state where the light source 112 is turned on, the dark reading process that is to be executed in a state where the light source 112 is turned off, does not need to be executed.

Accordingly, the abnormality determination portion 84 can also determine, in a relatively short time, that the device state is defective or abnormal.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:

a light source configured to irradiate light to a document sheet or to a reference portion having a uniform color;

an image sensor having a plurality of light receiving elements that are arranged in alignment along a main scanning direction, the plurality of light receiving elements being respectively assigned to a plurality of channels and receiving light reflected on the document sheet or the reference portion, the image sensor configured to output a plurality of image signals representing amounts of light respectively detected by the plurality of light receiving elements for the plurality of channels;

a conversion device configured to perform a level adjustment on the plurality of image signals respectively for the plurality of channels based on a level of an adjustment signal that is adjusted in advance, and convert the plurality of image signals after the level adjustment, to a plurality of pieces of pixel data of one line extending in the main scanning direction, the plurality of pieces of pixel data respectively corresponding to the plurality of light receiving elements;

an adjustment device configured to adjust the level of the adjustment signal based on a representative value of a plurality of pieces of first pixel data that are a plurality of pieces of pixel data of one line obtained when the light source is turned off;

a first representative pixel identifying device configured to identify first representative pixel data that represents a maximum amount of light, among a plurality of pieces of second pixel data that are a plurality of pieces of pixel data of one line obtained when the light source is turned on after the level of the adjustment signal is adjusted;

a first determination device configured to determine that a device state is normal when each of all values of a plurality of pieces of third pixel data represents an amount of light that is equal to or larger than an amount of light corresponding to a predetermined first threshold, the plurality of pieces of third pixel data being a plurality of pieces of pixel data of one line obtained while the light source is irradiating light to the reference portion after the level of the adjustment signal is adjusted;

a conspicuous channel identifying device configured to, when the first determination device does not determine that the device state is normal, identify, from among the plurality of channels, one or more conspicuous channels each of which corresponds to a plurality of pieces of third pixel data including a piece of third pixel data representing an amount of light smaller than an amount of light corresponding to the first threshold;

a second representative pixel identifying device configured to identify, for each of the one or more conspicuous channels, second representative pixel data that represents a minimum amount of light and third representative pixel data that represents a maximum amount of light, from among the plurality of pieces of third pixel data corresponding to each of the one or more conspicuous channels;

a second determination device configured to, for each of the one or more conspicuous channels, when the third representative pixel data represents an amount of light that is equal to or larger than an amount of light corresponding to at least a second threshold or a third threshold, determine that the device state is defective, and otherwise, determine that the device state is abnormal, the second threshold being determined based on the first representative pixel data, the third threshold being determined for each of the one or more conspicuous channels based on the second representative pixel data and the first representative pixel data; and a notifying device configured to make a notification that is different between a case where the device state is determined to be defective and a case where the device state is determined to be abnormal, wherein the second threshold corresponds to an amount of light that is larger than an amount of light represented by the first representative pixel data, and the third threshold corresponds to an amount of light that is larger than an amount of light represented by the second representative pixel data.

2. The image reading device according to claim 1, wherein the second threshold is obtained by adding a predetermined value to the first representative pixel data, and the third threshold is obtained for each of the plurality of channels by adding a predetermined value to the second representative pixel data.

3. The image reading device according to claim 1, wherein the adjustment device adjusts the level of the adjustment signal so that the representative value of the plurality of pieces of first pixel data matches a predetermined reference value.

4. An image forming apparatus comprising:

the image reading device according to claim 1; and a print processing device configured to form an image on a sheet based on a plurality of pieces of pixel data that are obtained in the image reading device while the light source is irradiating light to the document sheet.

* * * * *